Jan. 27, 1942.   H. A. WATSON   2,271,165
WATER CLARIFICATION AND SUPPLY SYSTEM
Filed Oct. 7, 1940
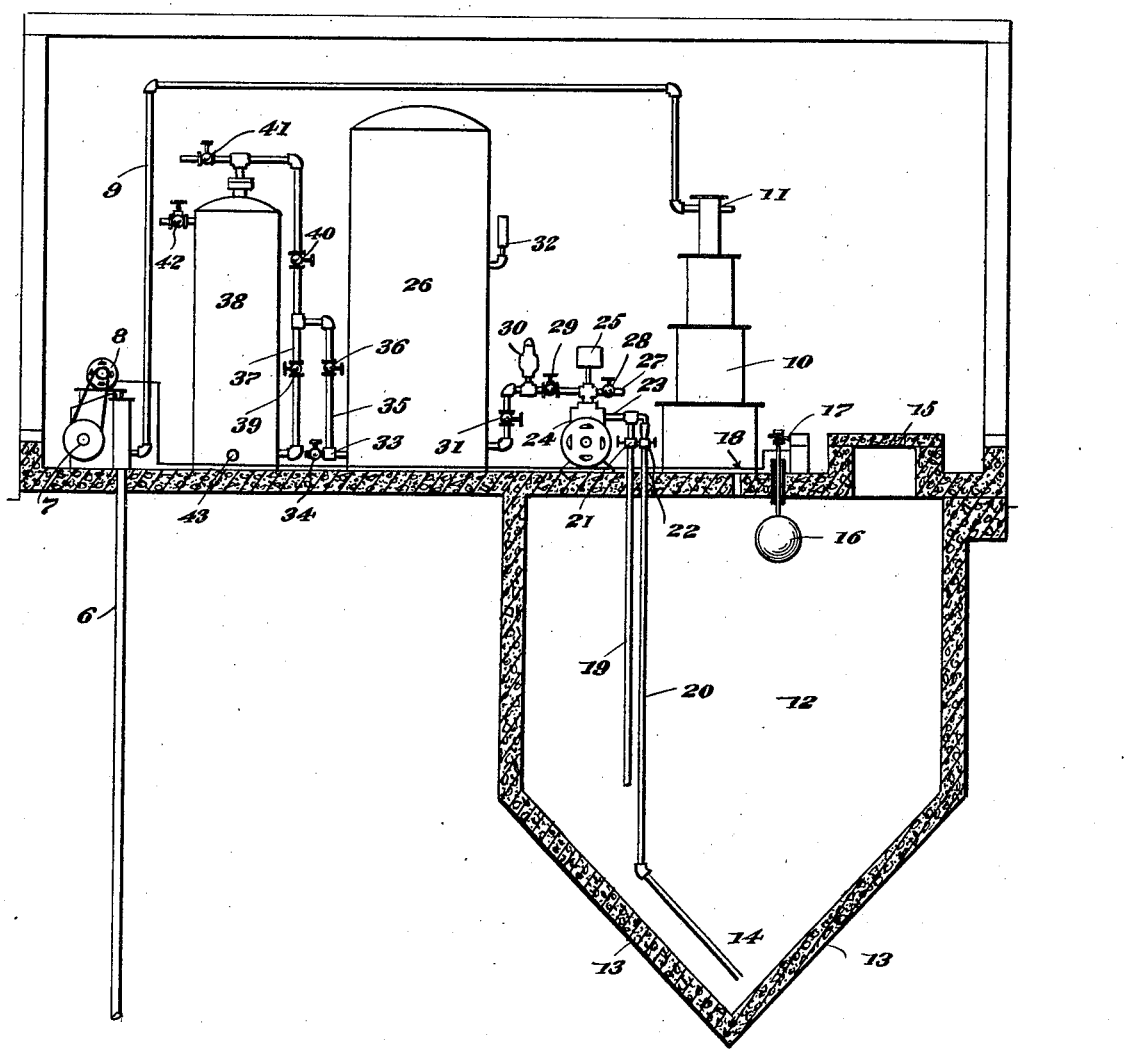
Inventor
HARVEY A. WATSON Patented Jan. 27, 1942

2,271,165

UNITED STATES PATENT OFFICE 2,271,165

WATER CLARIFICATION AND SUPPLY SYSTEM

Harvey A. Watson, Whitehaven, Tenn.

Application October 7, 1940, Serial No. 360,185

3 Claims. (Cl. 210—16)

This invention relates to water purification or clarification systems and finds its main utility in domestic, school, industrial plant and other local systems as distinguished from general or city systems.

The system is of the type wherein water from a deep well or the like is pumped from the same, passing through an aerator and thence into a sediment tank where it is allowed to settle and a large percentage, usually from 50% to 75% of the iron and other foreign matter is settled into the bottom of the sediment tank and is removed therefrom by action of a pump on a pipe line.

The main object of the invention is to provide a water purification system of the type referred to wherein the parts are so arranged that the water that reaches the pneumatic or pressure tank has been aerated to release carbon dioxide, sulphur and other undesirable gases therefrom and which water at the time it is introduced into the pressure tank is free from gases and contains only a small percentage of iron or other foreign solid matter.

Another object is to provide a water purification system in which the duty of the filter is relieved because of the relatively pure condition of the water that is fed to it from the pressure tank.

Another object is to provide a system in which the sand or gravel filter may be dispensed with and a water softener substituted therefor, the water in the pneumatic tank containing such a small amount of foreign matter that it can readily be purified and handled by a known water softener.

Another object is to provide an efficient and simple means for removing the sediment which settles into the bottom of the sedimentation tank from the same which means is quick and satisfactory.

A further object is to provide a system in which the sand or gravel filter may be dispensed with and a water softener substituted therefor, the water in the pressure tank containing such a small amount of foreign matter that it can readily be purified and handled by a known water softener.

Other objects and advantages will appear from the following description and accompanying drawing.

The drawing is generally a diagrammatic view of the system.

Referring to the drawing in detail a deep well or the like is indicated at 6 having connected at its upper end a pump 7 driven by a motor 8. The pump 7 in operation pumps water from the well through a pipe 9 into an aerator 10 of a general and known construction. The aerator 10 has at its upper end a gas outlet as at 11 to allow gases, such for example as carbon dioxide and sulphur gases to escape as the water is being aerated.

From the aerator the water, after being liberated of undesirable gases, passes into a sediment tank 12, the bottom wall 13 of which converges inwardly from all sides to form a sump or catch 14. That is the area in which iron and other solid foreign matter settles and from there may be pumped out as will hereinafter appear. The sediment tank has a manhole 15 for access to the tank if necessary. Also, within the sediment tank is a float 16 connected to a switch 17, which switch is in circuit through a wire 18 with the electric motor 8 of the pump 7. It will be seen that the float 16 controls the operation of the pump 7 which is stopped when the water in the tank reaches a predetermined high.

Two pipes 19 and 20 extend into the sediment tank, the pipe 20 being longer than the pipe 19 and extending into the bottom of the tank in communication with the part that holds the sediment. Pipe 19 extends into the tank and is the means by which the water is pumped out. The pipes 19 and 20 at their upper ends are each equipped with a valve 21 and 22, respectively and the pipes converge into a single pipe 23 which is connected to an electrically operated pump 24. Connected to the motor is a pressure switch 25 which controls the operation of the pump 24, by opening the circuit when the pressure reaches a certain high point. A pipe extends from the pump to a pneumatic tank 26. This pipe is open to atmosphere at one end 27 which has a valve 28 therein. The pipe also has a check valve 29 and a pressure relief valve 30 and a main valve 31 for controlling the feed to the pneumatic tank. The pneumatic tank has a pressure gage 32 thereon.

The pneumatic tank has an outlet 33 with a valve 34 whereby water can be, when desired, distributed to the yard or other desirable place. A pipe 35 having a valve 36 joins a pipe 37 extending into the bottom of a filter or water softener 38. The pipe 37 has above and below the joint of the pipe 35 a valve 39 for shifting the water from the wash back of the filter and a valve 40 for controlling the inlet to the filter. The pipe 37 has an air relief valve 41 and the filter at its top has a wash back valve 42. At the bottom of the filter or water softener is an outlet 43 whereby clear pure water is conveyed to the service where pure water is needed as to the bath, kitchen or the like.

It will be understood that a known water softener device can be substituted for the filter or a softener can be placed after the filter if desired.

In operation of the system after the sediment tank has been filed and with the valves 22 and 27 closed and valve 31 open the pump 24 is started and water is pumped out of the tank 12 through the pipe past the main valve 31 into the pneumatic or pressure tank. It will be seen that the water from the sediment tank that is pumped to the pneumatic tank is free from undesirable gases and almost completely free from iron and other solid foreign matter.

In order to withdraw the sediment from the tank the valves 21 and 31 are closed and the valves 22 and 28 are opened. With the pump 24 operating the sludge and sediment in the bottom of the sediment tank is pumped up through the pipe 20 and out to atmosphere at 27 past the valve 28. This is a very novel and efficient manner of withdrawing the solid sediment.

Now the partly purified water in the pneumatic tank, can, after the valve 36 is closed, be withdrawn through the outlet 34 and this water is pure enough to be used for watering stock, fire protection, irrigation, washing cars and other similar uses. This water being free from the undesirable gases will not clog the pipes. The filter or softener will therefore not have to handle this water or in other words all of the water in the system and thus will relieve the filter or softener of from 75% to 90% of its usual work.

The water that eventually goes through the filter or softener will go to the supply pipe to the kitchen and bathroom, where absolutely pure water is desired. It will thus be seen that the filter or softener can be substantially reduced in size as it is required to handle only a small amount of the water used and does not handle all the water that goes to the pressure tank. This will greatly reduce the cost of such a system and it has been found that the filter can be dispensed with altogether and only a softener used, this due of course to the relative purity of the water coming from the pressure tank.

I have therefore provided a system which is cheap to install and one in which only a water softener need be used which has been impossible with other systems of which I am aware. And even if in some parts of the country it is found that a sand filter need be used this can be greatly reduced in size because it does not have to handle all the water passing into the system.

I claim:

1. In a liquid purification apparatus, the combination of a well pump, an aerator connected by a pipe line to the well pump and into which said pump discharges, a sedimentation tank having an opening in communication with said aerator and into which the aerator discharges, a second pump connected by pipe lines to said sedimentation tank for drawing water from said tank, a pressure tank connected by a pipe line from the second pump and into which the said pump delivers, a water purifying device, a pipe line connecting the pressure tank and the water purifying device, a valve in said pipe line to cut-off the flow of water from the pressure tank to the purifying device, and a valve controlled outlet in said pipe line and communicating with the pressure tank ahead of the first mentioned valve whereby when the first mentioned valve is opened water is discharged direct from said tank.

2. In a liquid purification apparatus, the combination of a well pump, an aerator connected by a pipe line to the well pump and into which said pump discharges, a sedimentation tank having an opening in communication with said aerator and into which the aerator discharges, a second pump, water and sediment conducting pipes connected to the second pump and extending into the tank, valves in the respective pipes, a pressure tank, a pipe line connecting said pressure tank to the second pump, said pipe line having one end opened to atmosphere, valves in said pipe line, one for controlling the delivery from the pump into the pressure tank when only the valve in the water conducting pipe is open, and the other for controlling the delivery of sediment to atmosphere when only the valve in the sediment conducting pipe is opened, and a water purifying device connected by a pipe line to said pressure tank.

3. In a liquid purification apparatus, the combination of a well pump, and aerator connected by a pipe line to the well pump and into which said pump discharges, a sedimentation tank having an opening in communication with said aerator and into which the aerator discharges, a second pump, water and sediment conducting pipes connected to the second pump and extending into the tank, the inlet to the sediment tank below the inlet to the water pipe, valves in the respective pipes, a pressure tank, a pipe line connecting said pressure tank to the second pump said pipe line having on end opened to the atmosphere, valves in said pipe line, one for controlling the delivery from the pump into the pressure tank when only the valve in the water conducting pipe is open, and the other for controlling delivery of sediment to atmosphere when only the valve in the sediment conducting pipe is opened, and a water purifying device connected by a pipe line to said pressure tank.

HARVEY A. WATSON.